United States Patent
Jen

(10) Patent No.: US 6,913,806 B2
(45) Date of Patent: Jul. 5, 2005

(54) COPOLYESTER COMPOSITION FOR MANUFACTURING LARGE VOLUME POLYESTER BOTTLE

(75) Inventor: Zo-Chun Jen, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 627 days.

(21) Appl. No.: 10/325,109

(22) Filed: Dec. 20, 2002

(65) Prior Publication Data

US 2004/0122207 A1 Jun. 24, 2004

(51) Int. Cl.$^7$ .......................... B29D 22/00; C08G 63/02
(52) U.S. Cl. ............... 428/35.7; 528/298; 528/302; 528/308; 528/308.6; 428/36.92
(58) Field of Search .................. 528/298, 302, 528/308, 308.6, 428; 428/35.5, 36.92

(56) References Cited

U.S. PATENT DOCUMENTS

| | | |
|---|---|---|
| 5,571,584 A | 11/1996 | Yamamoto et al. |
| 5,643,991 A | 7/1997 | Stipe et al. |
| 5,714,570 A | 2/1998 | Kim et al. |
| 5,736,621 A | 4/1998 | Simon et al. |
| 5,851,612 A | 12/1998 | Umeda et al. |
| 5,864,005 A | 1/1999 | Kim et al. |
| 5,898,060 A | 4/1999 | Suzuki et al. |
| 6,296,950 B2 | 10/2001 | Murouchi et al. |
| 6,309,718 B1 | 10/2001 | Sprayberry |

FOREIGN PATENT DOCUMENTS

| | | |
|---|---|---|
| JP | 07223623 | 8/1995 |
| JP | 09076333 | 3/1997 |
| JP | 11246658 | 9/1999 |
| JP | 2000169562 | 6/2000 |
| JP | 2000178347 | 6/2000 |
| JP | 2001192441 | 7/2001 |
| JP | 2002053699 | 2/2002 |
| JP | 2002201345 | 7/2002 |

*Primary Examiner*—Samuel A Acquah
(74) *Attorney, Agent, or Firm*—Johnson & Associates, P.C.; Chauncey B. Johnson, Esq.

(57) ABSTRACT

A copolyester composition which includes polyethylene terephthalate (PET) is used to manufacture bottle embryos having weight greater than 600 grams and thickness greater than 7.0 millimeters. The copolyester composition of this invention is used to manufacture containers having an inner volume greater than 10 liters. The components of this copolyester composition are polyethylene terephthalate resin, X mole % of isophthalic acid (IPA), Y mole % of diethylene glycol (DEG) and Z mole % of 2, 6 napthalene dicarboxylic acid where X, Y, and Z conform to the following conditions:

$2.5 \leq X < 6.0$, $2.5 \leq Y \leq 5.0$, $0 \leq Z \leq 5.0$; and the copolyester composition has an intrinsic viscosity of between 0.75 and 0.85 dl/g.

7 Claims, No Drawings

COPOLYESTER COMPOSITION FOR MANUFACTURING LARGE VOLUME POLYESTER BOTTLE

BACKGROUND OF THE INVENTION

1. Field of this Invention

This invention relates to a polyethylene terephthalate (hereafter "PET") copolyester composition used to manufacture polyester bottles of different sizes ranging from volumes of 10 liters and up to 5 gallons. Specifically, this invention relates to a PET copolyester composition used to manufacture bottle embryos with weight greater than 600 grams and thickness greater than 7.0 millimeters and containers with an inner volume greater than liters.

2. Description of Related Prior Art

Bulk water market has been expanding gradually as the public pays more attention to the quality of drinking water. Many public sites and business offices now provide distilled water contained in 5-gallon containers for drinking. Traditionally, bulk water containers have been made from polyvinyl chloride (PVC) or polycarbonate (PC) material. Although it is cheaper to use PVC due to environmental concerns the use of this material has declined considerably. Similarly, although containers made of PC have excellent qualities the material cost is considerably expensive.

The use of PET copolyester material presents a promising solution, although present prior art compositions used have resulted in products with numerous quality problems. Prior art PET copolyester compositions used to manufacture bottles for carbonic acid beverages, mineral water or tea beverages usually contain 0–3 mole % of isophthalic acid (hereafter "IPA") based on the total weight of the copolyester or 1.5–4.0 mole % of diethylene glycol (hereafter "DEG") based on the total weight of the copolyester. These composition range ratios, which results in the easy crystallization of the copolyester material during the inject-stretch-blow-molding process, are suitable for manufacturing embryos with thickness of between 3–4 mm and maximum weight of between 100-120 grams, and are suitable for manufacturing bottles with an inner volume of less than 5 liters. However, when the same composition range ratios are used to manufacture bottle embryos with thickness greater than 7 mm and weight greater than 600 grams the bottle embryos are covered with crystalline haze, which causes instability during the inject-stretch-blow-molding process. To prevent the hazing effect, the prior art teaches extending the cooling time of the bottle embryos which is uneconomical and lowers overall productivity.

Attempting to solve the problem of hazing and extension of bottle embryos cooling time, U.S. Pat. No. 6,309,718B1 teaches using a copolyester composition which produces bottle embryos having weight greater than 200 grams and manufactured bottles with an inner volume of several gallons. The copolyester composition taught by the aforementioned patent contains 4–10 mole % of cyclohexane dimethanol or 6–17 mole % of isophthalic acid or a combination of both compounds, dicarboxylic acid compound such as 2,6-naphthalene dicarboxylic acid with a maximum mole % of 50 and an intrinsic viscosity of between 0.75–0.85 dl/g.

SUMMARY OF THE INVENTION

An object of this invention is to disclose a copolyester composition which includes PET used to manufacture bottle embryos having weight of greater than 600 grams and thickness of greater than 7.0 millimeters, and to manufacture containers having an inner volume of over 10 liters. The components of this copolyester composition are polyethylene terephthalate resin, X mole % of isophthalic acid, Y mole % of diethylene glycol and Z mole % of 2,6 napthalene dicarboxylic acid where X, Y, and Z conform to the following conditions:

$2.6 \leq X < 6.0$;
$2.6 \leq Y \leq 5.0$;
$0 \leq Z \leq 5.0$; and the copolyester composition has an intrinsic viscosity of between 0.75 and 0.85 dl/g.

Another object of this invention is to disclose a copolyester composition containing PET used to manufacture large inside volume polyester bottle by injection-stretch-blow-molding process, wherein the copolyester composition is transformed into transparent bottle embryos, heated with a near infrared light tube up to and above the glass transition temperature and subsequently blow-molded and shaped into bottles.

Still, another object of this invention is to disclose a copolyester compostion containing PET used to manufacture large inner volume bottles having excellent transparency and yet strong enough to contain over 10 liters of water or 5 gallons of water without breaking during transporting.

Yet still, another object of this invention is to disclose a copolyester compostion containing PET used to manufacture polyester bottles that are easy to clean and are reusable.

A further object of this invention is to disclose a copolyester composition containing PET used to manufacture polyester bottles with an overall lower production cost than bottles manufactured from polycarbonate materials.

Other objects, aspects, advantages and novel features of this invention will become more apparent from the following detailed description.

DETAILED DESCRIPTION OF THE INVENTION AND THE PREFERRED EMBODIMENT

The present invention discloses a copolyester composition having PET resin as its main component and further comprising X mole % of IPA based on the overall weight of the copolyester, Y mole % of DEG based on the overall weight of the copolyester and Z mole % of 2,6-naphthalene dicarboxylic acid based on the overall weight of the copolyester, where X, Y, and Z conforms to the following conditions:

$2.5 \leq X < 6.0$,
$2.5 \leq Y \leq 5.0$,
$0 \leq Z \leq 5.0$; and the IPA is added during the melting reaction process and, except for the DEG spontaneously generated during the melting reaction, limited DEG is added to reach the targeted contents of the reaction process.

The PET copolyester composition of the present invention is prepared by melting-polymerization methodology well known in the art. The process starts with preparing a slurry containing purified terephthalic acid and ethylene glycol and adding 2.5–6.0 mole % of IPA based on the final weight % of the copolyester composition. Limited diethylene glycol is then added so that the limited diethylene isophthalic acid and the spontaneously generated diethylene glycol is between 2.5–5.0 mole % based on the final weight % of the copolyester composition. In the presence of catalyst, heat stabilizer, toner and other additives such as antioxidant, light stabilizer, and lubricant, 2, 6-napthalene dicarbaxylic acid with a content of no more than 5.0 mole % is subsequently added and esterification takes place at a reaction temperature range of between 250–260° C. Esterification is then followed by a prepolymerization reaction with a temperature range of between 265–275° C. under vacuum conditions. Next, a polycondensation reaction takes place at a temperature range of between 275–285° C. and a vacuum pressure of 1 torr. When the intrinsic viscosity of the polymer reaches a minimum of 0.55 dl/g the polymer is unloaded, cooled and cut into column shape polyester chips.

The polyester chips are then subjected to a solid phase polymerization reaction, which raises the intrinsic viscosity to between 0.75 and 0.85 dl/g. The solid phase polymerizing reaction is followed by a continuous crystallizing process, a drying process and a preheating process to bring the reaction temperature up to between 205–220° C. and to raise the intrinsic viscosity in the solid phase polymerization tank through which nitrogen gas is continuously fed to eliminate the ethylene glycol and the water produced by the reaction. The resulting copolyester is then dried and fed into an injection machine to produce bottle embryos having weight greater than 600 grams and thickness greater than 7 mm and length of about 36 cm. Preferably, the bottle embryos should have weight between 600 and 800 grams, thickness of between 7.5 and 9.5 mm, length of between 36 and 42 cm for an injection cycle of between 90–130 seconds. The aforementioned manufacturing process produces bottle embryos having excellent transparency without the presence of crystalline haze covering.

A differential scanning calculator (DSC) is used to analyze the copolyester composition of the present invention. The test procedure consists of taking about 3 mg of solid-phased polymerization copolyester, heating the copolyester to about 300° C. in order to melt the copolyester at which point the temperature is maintained for 5 minutes. The material is then quickly cooled down to room temperature and the material's temperature is subsequently raised at a rate of 20° C./min to enhance the polymer's ability to transition through the desired glass transition temperature zone, crystallization temperature zone and melting point temperature zone of the reaction process. Heat released at the peak of the crystallization temperature zone and the areas of the released heat should measure less than 10 Joules/gram or preferably less than 6 Joules/gram. The area of released heat of the crystallization temperature zone of the present invention is far less than the area of released heat of crystallization temperature zone of ordinary, prior art copolyester used to manufacture smaller inner volume polyester bottles. Normally the released heat of crystallization of the ordinary, prior art copolyester composition is above 15 Joules/gram and can be higher than 25 Joules/gram in some instances. Therefore, the copolyester composition of the present invention restrains crystallization rate while shortening the processing cycle to produce thick transparent and heavy bottle embryos by the addition of copolymerized modifiers.

The bottle embryos of the present invention are further manufactured into containers having inner volume greater than between 10–20 liters by using stretch-blow-molding methodology well-known in the art. The stretch-blow-molding method uses near infrared light to heat up the bottle embryos to a temperature range over that of the glass transition temperature and the molding method is best conducted at temperature ranges between 20° C.–40° C. Larger inner volume containers made from the copolyester composition of the present invention have excellent transparency and strength and are easier to clean and can be reused numerous times and thus are environmentally friendly.

EXAMPLES AND COMPARATIVE EXAMPLES

The following examples and comparative examples are provided to further illustrate characteristics of the present invention. The examples and comparative examples are provided only to illustrate the present invention and should not be construed as limitations.

Example 1

79.54 kg of purified terephthalic acid (PTA), 4.755 kg of isophthalic acid (IPA), 1.38 Kg of diethylene glycol (DEG), and 37.78 Kg of ethylene glycol (EG) are stirred together to form a well-distributed slurry which is then heated up to 260° C. to drive the esterification reaction at a pressure of between 1.5–2.0 kg/cm$^2$. When an esterification ratio greater than 95% is reached 14 grams of phosphoric acid, 45 grams of antimony acetate, and 100 grams of cobaltous acetate are added to the reaction. The reaction temperature is then raised up to 270° C. to facilitate the pre-polymerization reaction phase while the reaction pressure is being controlled at between 760-20 torr. After reacting for 1 hour the temperature is further increased to a maximum temperature of up to 280° C. and the vacuum intensity is decreased below 1 torr. Polycondensation is continued until the intrinsic viscosity reaches 0.60 dl/g. Then the resulting compound is injected through a die head, cooled, and cut into column shape polyester chips.

To perform analysis, polyester chips which contain 5.5 mole % of IPA based on the overall mole % of a chip and 2.5 mole % of DEG based on the overall mole % of a chip are loaded in a twin-awl revolving vacuum drying tank having a temperature range of between 200° C.–220° C. and a vacuum pressure intensity lower than 1 torr, at which time solid-phase polymerization reaction occurs and the intrinsic viscosity of the polyester chips is raised up to 0.80 dl/g. After completion of the solid-phase polymerization process, the copolyester is analyzed using a Perkin Elmer Corporation Differential Scanning Calculator (DSC). Analysis using the DSC involves first quickly raising the temperature of the polyester chips up to 300° C. in order to melt the polyester chips, then quickly cooling it down and further heating the polyester chips with a temperature raising rate of 20° C./min and then measuring the released heat by crystallizing the polyester, which was determined as 4.5 Joules/gram.

By injecting the copolyester which has been solid-phase polymerized into an injection machine at a melting temperature of between 275° C.–280° C. bottle embryos having weight of 685 grams, body thickness of between 8.5–9.0 mm, and length of about 410 mm were produced. The bottle embryos made from the copolyester had excellent transparency and were not covered with crystalline haze. The manufactured bottle embryos are placed into a stretch-blow-molding machine to perform blow-molding while maintaining the bottle embryos' temperature at 110° C. to produce containers having an inner volume of 5 gallons. The stretch-blow-molding process is stable and the transparency and strength of the containers produced are excellent.

Example 2

The process used in this example is similar to Example 1, however, the copolyester composition contains 4.5 mole % of IPA and 2.5 mole % of DEG and the intrinsic viscosity of the copolyester composition is maintained at 0.81 dl/g after solid-phase polymerization has occurred. Using a DSC, the released heat due to crystallization was determined as 6.8 Joules/gram.

Using an injection machine, the manufactured bottle embryos exhibited good transparency and were not covered with crystalline haze. When the same bottle embryos are further placed into a stretch-blow-molding machine for transformation into containers having an inner volume of 5 gallons, the resultant products bore similar transparency and strength qualities as those exhibited by the bottle embryos.

Example 3

The process used in this example is similar to Example 1, however, the copolyester composition contains 2.5 mole % of IPA, 2.5 mole % of DEG, and 5.0 mole % of 2,6-naphthalene dicarboxylic acid and a copolyester composition intrinsic viscosity of 0.78 dl/g after solid-phase polymerization has occurred. Using a DSC, the released heat due to crystallization was determined as 2.2 joules/gram.

Using an injection machine, the manufactured bottle embryos exhibited good transparency and were not covered with crystalline haze. When the same bottle embryos are further placed into a stretch-blow-molding machine for transformation into containers having an inner volume of 5 gallons, the resultant products bore similar transparency and strength qualities as those exhibited by the bottle embryos.

Comparative Example 1

The process is similar to Example 1, however, the copolyester composition contains 2.4 mole % of IPA, 2.4 mole % of DEG and has an intrinsic viscosity of 0.80 dl/g after the solid phase polymerization reaction process has occurred. Using a DSC, the released heat due to crystallization was determined as 17.3 Joules/gram.

Using an injection machine, the manufactured bottle embryos were covered with crystalline haze and exhibited bad transparency. The bottle embryos were subsequently placed into a stretch-blow-molding machine, heated with a nearinfrared light tube and blow-molded into bottles having an inner volume of 5 gallons. The bottles displayed a considerable amount of crystalline haze and broke easily during the blow-molding process.

Comparative Example 2

The process is similar to Example 1, however, the copolyester composition contains 2.4 mole % of IPA, 2.4 mole % of DEG and the intrinsic viscosity of the copolyester composition is kept at 0.84 dl/g after solid phase polymerization has occurred. Using a DSC, the released heat due to crystallization was determined as 15.5 Joules/gram.

Using an injection machine, the manufactured bottle embryos were covered with crystalline haze and exhibited bad transparency. The bottle embryos were subsequently placed into a stretch-blow-molding machine, heated with a near infrared light tube and blow-molded into bottles having an inner volume of 5 gallons. The bottle displayed a considerable amount of crystalline haze and broke easily during the blow-molding process.

It should be understood, however, that even though numerous characteristics and advantages of the present invention have been set forth in the foregoing description, together with details of the method, the process and the description of component ratios and related examples, the disclosure is illustrative only and changes may be made in the description within the principles of the invention to the full extent indicated by the broad general meaning of the terms in which the appended claims are expressed.

What is claimed is:

1. A polyethylene terephthalate copolyester composition for manufacturing bottle embryos having weight greater than 600 grams and thickness greater than 7.0 millimeters, and for manufacturing containers having an inner volume greater than 10 liters comprising: polyethylene terephthalate resin, X mole % of isophthalic acid based on said copolyester composition, Y mole % of diethylene glycol based on said copolyester composition, Z mole % of 2,6-naphthalene dicarboxylic acid based on said copolyester composition.

2. The polyethylene terephthalate copolyester composition as described in claim 1 wherein X, Y, and Z mole % conforms to the following conditions:

$2.5 \leq X < 6.0$, $2.5 \leq Y \leq 5.0$, and $0 \leq Z \leq 5.0$.

3. The polyethylene terephthalate copolyester composition as described in claim 2, wherein an intrinsic viscosity of said copolyester composition is between 0.75 and 0.85 dl/g.

4. The polyethylene terephthalate copolyester composition as described in claim 3, wherein crystallized released heat of said copolyester composition produced and analyzed using a differential scanning calculator at a temperature raising rate of 20° C./min is less than 10 Joules/gram.

5. The polyethylene terephthalate copolyester composition as described in claim 3, wherein bottle embryos with weight of greater than 600 grams and thickness of greater than 7.0 millimeters are produced using an injection machine.

6. The bottle embryos as described in claim 5, wherein said embryos have weight, thickness and length between of 600–800 grams, 7.5–9.5 millimeters, and 36–42 centimeters respectively.

7. The bottle embryos as described in claim 5, wherein said embryos are used to manufacture polyester containers using stretch blow-molding to produce containers with inner volume of greater than 10 liters.

* * * * *